March 1, 1966  F. J. SAUER  3,238,403
INDUCTION MOTORS
Filed Oct. 27, 1960  3 Sheets-Sheet 1
FIG.1
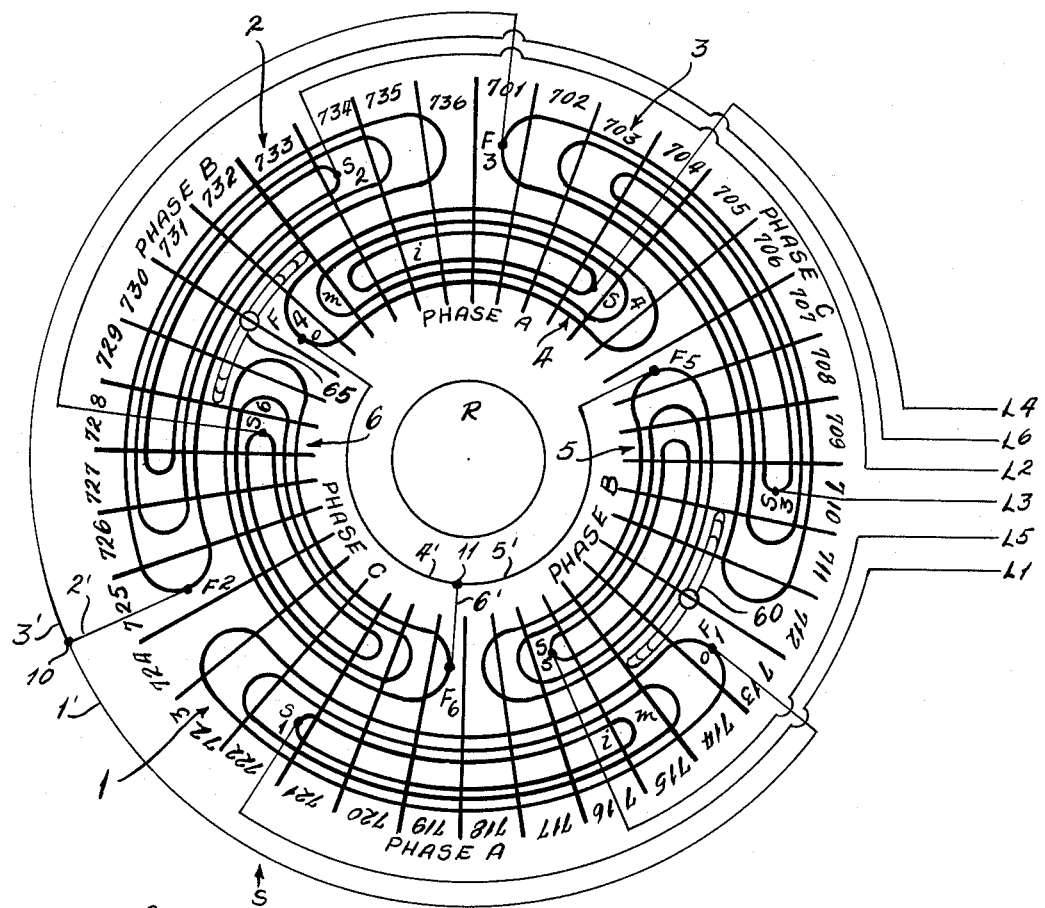
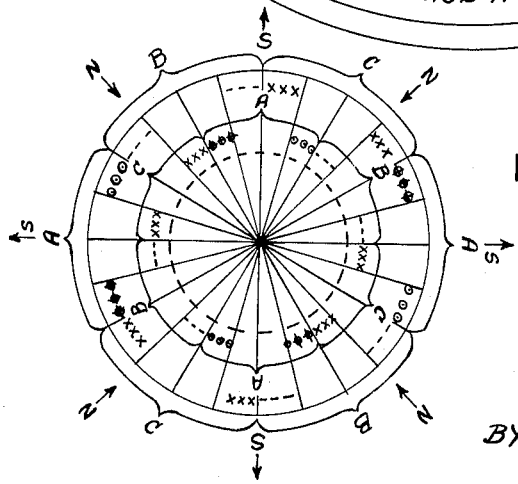
FIG.6
INVENTOR:
FRANCIS J. SAUER
BY *Sutherland, Pohler & Taylor*
ATTORNEYS.

March 1, 1966   F. J. SAUER   3,238,403
INDUCTION MOTORS
Filed Oct. 27, 1960   3 Sheets-Sheet 2

INVENTOR:
FRANCIS J. SAUER
BY Sutherland, Porter & Taylor
ATTORNEYS.

United States Patent Office 3,238,403
Patented Mar. 1, 1966

3,238,403
INDUCTION MOTORS
Francis J. Sauer, Dellwood, Mo., assignor to Emerson Electric Co., a corporation of Missouri
Filed Oct. 27, 1960, Ser. No. 65,484
15 Claims. (Cl. 310—192)

This invention relates to induction motors. It has particular utility in a three-phase induction type motor, having an integral multiple of four poles.

The illustrative embodiment shown and described is a three-phase, four-pole induction motor with a squirrel cage rotor. Accordingly, the state of the art, and the advantages of the present invention will be described with reference to such a motor. However, as has been pointed out above, the advantages and utility of the present invention are not confined to the specific embodiment shown and described.

Three-phase, four-pole, induction type motors have conventionally been either lap wound or concentrically wound. In the former type of winding, the number of coils equals the number of slots, and two coil sides occupy the same slot, with insulation between them sufficient to protect against the voltage potential difference in the two coils. The coils are identical, and for reactance symmetry are placed so that one side of each coil occupies the bottom of one slot while the other side occupies the top of another slot. This type of winding does not lend itself to machine insertion, and is difficult, compared with concentric winding, to insert manually. The operating characteristics of lap type winding are excellent. In the conventional concentric coil type of winding, some of the desirable operating characteristics of the lap type winding are sacrificed in the interest of greater economy in production. Conventionally, four coil groups or sets are provided for each phase in a four-pole motor. While the numbers of coils used range from half the number of slots to the full number of slots, most such conventional windings have involved the insertion of a side or reach of two different coils in a single slot, thus requiring an insulator between the two coil sides, sufficient to protect against the voltage potential difference between them.

One of the objects of this invention is to provide an induction type motor with windings which combine the desirable operating characteristics of the lap type of winding with even greater ease and economy of manufacture than is provided by the conventional concentric type of winding.

Another object is to provide such a motor with a part winding start which draws less current initially than conventional windings.

Still another object of this invention is to provide such a winding in combination with one or more thermal protectors, in such a way as to require substantially fewer protectors than conventional windings to achieve equal protection.

Other objects will become apparent to those skilled in the art in the light of the following description and accompanying drawing.

In accordance with this invention, generally stated, a three phase induction motor, having an integral multiple of four poles, is provided which includes a rotor and a wound slotted stator having a plurality of pairs of oppositely disposed, substantially identical coil sets, each of the coil sets being made up of a plurality of nesting coils. The coils of the oppositely disposed coil sets are electrically connected to one electrical phase to produce within their compasses poles of the same polarity. Successive of these coil sets which are connected to the same electrical phase, are displaced three hundred and sixty electrical degrees. In the case of a four-pole motor, only one pair of coil sets is connected to one phase, and the "successive" coil sets of one phase are centered one hundred eighty mechanical degrees apart. In an eight-pole motor, there are two pairs of coil sets connected to the same phase, successive coil sets of the same phase being centered ninety mechanical degrees apart. The circumferentially outer of the coils (generally two in number) of successive coil sets of the same phase (the oppositely disposed coil sets of a pair in a four-pole motor) are positioned sufficiently close to one another at either side, and are so related electrically as to produce between them poles of opposite polarity from and comparable flux distribution to the poles produced within the compass of the coils constituting the coil sets.

In general, the number of stator slots of the motor of this invention must be integrally divisible by the product of three (the number of phases) and the number of poles, and the quotient (of the number of slots divided by the said product), representing the number of coils per set, should be at least two.

In theory, the outermost coil of each coil set of the motor of this invention should embrace a number of mechanical degrees equal to 120 divided by the multiple of four poles with which the motor is provided, e.g., for a four-pole motor, 120°, for an eight-pole motor 60°. In practice, as will be explained hereinafter, the coils embrace a span less than the theoretical embrace by the angular "width" of one tooth. Thus, in a 36-slot, four-pole motor, each tooth is ten mechanical degrees "wide" and the outermost coil, embracing eleven teeth, embraces one hundred ten instead of the theoretical one hundred twenty degrees; in a 48-slot, eight-pole motor, each tooth is seven and a half mechanical degrees "wide" and each outermost coil, embracing seven teeth, embraces fifty two and a half mechanical degrees instead of the theoretical sixty degrees. The inner coils also span a shorter than theoretical arc for the same reason. Thus, for example, in the forty-eight slot, eight-pole motor, the inner coil (there being only two coils per set) spans thirty-seven and a half degrees instead of forty-five.

In the preferred embodiment, the motor is a three-phase, four-pole motor with a squirrel cage rotor. Each of the phases is connected to one pair of coil groups or sets, and each coil set contains three coils, making a total of eighteen coils. The stator has thirty-six slots, and each slot contains only one side of a coil. All of the coil sets are substantially identical. The term "substantially identical" is used to indicate that, while all of the coil sets are preferably identical, the two coil sets of any one pair may vary to a minor extent, for example, one might be five percent longer or shorter in circumference than the other. The coil sets may be inserted by machine as well as by hand. In the preferred embodiment, the number of turns in each coil is essentially the same, so that all of the slots are fully utilized. Since only one coil side is placed in a slot, there is no need for insulation between coil sides within the slots. Since the coil groups in each phase are identical, the resistance of the phases is equal. The coils are arranged to obtain a balance in the reactances of all three phases.

While it is highly desirable to have only a single coil side in a slot, the coils can be distributed (e.g., with five coils to a coil set and progressively distributed turns) for winding purposes. However, this necessitates the use of coil insulators and defeats one of the advantages of the preferred form.

The preferred embodiment of motor of this invention, as shown and described, is provided with a switch means for initially energizing only one of the coil sets of each of the pairs of coil sets, so as to provide a part winding start which has marked advantages over conventional starting arrangement. The locked rotor inrush current is substantially less than that of conventional part winding starting, and the heating is greatly reduced. Neither the initial energizing of the coils nor the subsequent energizing of the opposite coils of the coil set pairs produces any marked imbalance in the line. While this is an important feature of this invention, it will be understood by those skilled in the art that certain motors, e.g., motors of small ratings, need not be provided with any special starting arrangement.

The winding, especially in the case of the three-phase four-pole motor of the preferred embodiment, is uniquely adapted to use in combination with a thermal protector, since one thermal protector can be positioned to sense overheating in windings of three different phases. As a result, while conventional three-phase, four-pole winding requires at least three protectors for parallel connection and two protectors for series connection, the motor of this invention requires only two protectors for parallel connection and one protector for series connection. In general, the motor of this invention requires only half the number of protectors as the motor has poles. However, with a suitable heat collecting device (such as a long copper strap along the periphery between the layers of windings) a single protector can be used to provide sufficient protection for all of the coils, even though the coil sets are connected in parallel.

In the drawing:

FIGURE 1 is a diagrammatic view showing the relative angular position of the coils of one embodiment of the motor of this invention, their electrical connections; and the positioning of thermal protectors among them;

FIGURE 6 is a diagrammatic view of an eight-pole, three-phase motor of this invention, showing the mechanical relationship of the coils and the electrical relationship of the coil sets connected to one of the electrical phases.

Figure 2:
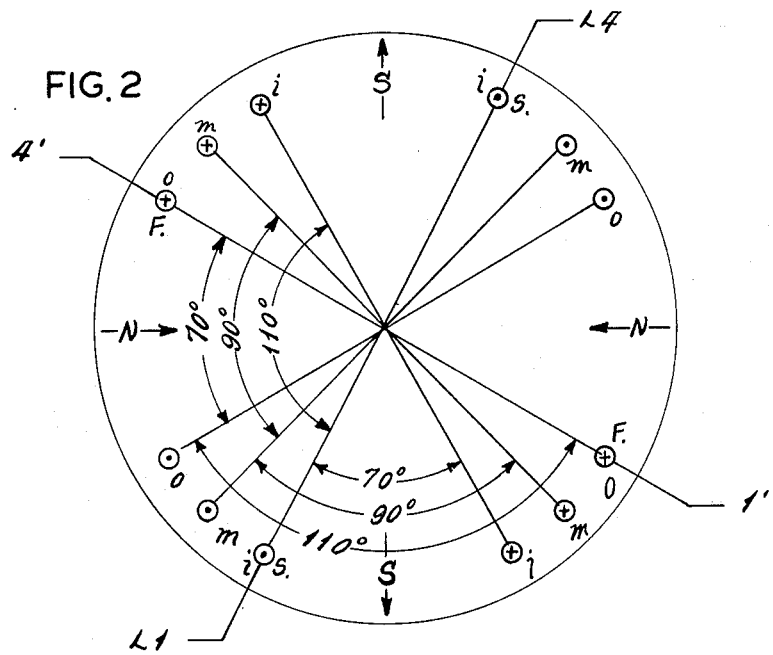
FIGURE 2 is a diagrammatic view showing the electrical relationship of the coil set pair connected to one phase.

Referring now to the drawing, and particularly to FIGURES 1–5, for an illustrative embodiment of motor of this invention, the motor includes a stator S and a rotor R. The rotor R is a conventional squirrel cage rotor for use in a three-phase, four-pole motor. The stator is a laminated stator with thirty-six equi-spaced slots 701–736, defined by an equal number of teeth, indicated diagrammatically in the drawing, in FIGURE 1 by radially extending lines.

In the illustrative embodiment of stator, there are six coil sets or groups, designated as 1, 2, 3, 4, 5 and 6. The coil sets are arranged in oppositely disposed pairs 1 and 4, 2 and 5, and 3 and 6. For purposes of clarity, coil sets 4, 5 and 6 are shown as inboard radially of coil sets 1, 2 and 3. In reality, it is the end wires of coil sets 4, 5 and 6 which are radially inboard of the end wires of the coil sets 1, 2 and 3, the axial reaches of the coils making up the coil sets 4, 5 and 6 extending within slots at substantially the same radial distance from the center of the stator as the axial reaches of the coils 1, 2 and 3. Thus, while the coil sets 1, 2 and 3 are sometimes hereinafter referred to as "outboard" coil sets, and coil sets 4, 5 and 6, as "inboard" coil sets it is to be noted that that terms "inboard" and "outboard" have reference to the radial position of the end wires of the coils making up the coil sets.

Each of the coil sets 1–6 is made up of three coils: an inner coil $i$, a mediate coil $m$ and an outermost coil $o$. Each of the inner coils $i$ spans on the order of 60 mechanical and 120 electrical degrees. Each of the mediate coils $m$ spans on the order of 90 mechanical and 180 electrical degrees, and each of the outermost coils $o$ spans on the order of 120 mechanical and 240 electrical degrees. The expression "on the order of" is used herein to mean as close as is physically possible. It can be seen that since each reach of every coil occupies a different slot, and since there are as many reaches as there are slots, and since, as is described hereinafter, there are outer coils of three successive coil sets each occupying on the order of 120 mechanical degrees of arc, the span of each of the outer coils must be less than 120 mechanical degrees by what has been described above as the angular width of one tooth. It is, however, as close to 120 mechanical degrees in its span, as the physical limitations of the stator will permit.

Coil set 2 is displaced (centered) 120 mechanical (240 electrical) degrees from (the center of) coil set 1, and coil set 3 is displaced 240 mechanical (480 electrical) degrees from coil set 1.

Coil set 4 is oppositely disposed from coil set 1, i.e., it is centered 180 mechanical degrees from coil set 1, and is therefore centered between coil sets 2 and 3. Coil set 5 is oppositely disposed from coil set 2, and is therefore centered between coil sets 1 and 3. Coil set 6 is oppositely disposed from coil set 3, and is therefore centered between coil sets 1 and 2.

It can be seen, then, that coil set pair 1–4 is displaced 60 mechanical (120 electrical) degrees from coil set pair 6–3, and 120 mechanical (240 electrical) degrees from coil set pair 2–5. As is explained more fully hereinafter, successive coil set pairs in any three-phase motor of this invention having an integral multiple of four poles, are displaced 120 electrical degrees.

Viewed in either direction of rotation, each of the coil groups has its start at the same end of the inner coil $i$ and its finish at the same end of the outer coil $o$. The starts of the coil sets are designated S with a subscript indicating the coil set, and the finishes are designated F with a subscript indicating the coil set.

Figure 5:
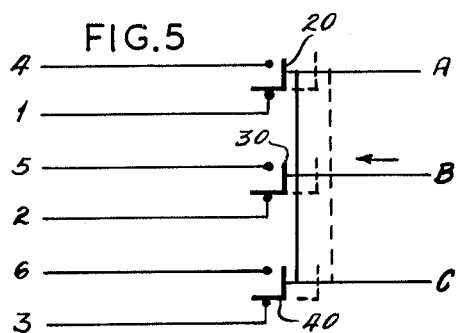
FIGURE 5 is a diagrammatic view of a switching arrangement for part winding start of the motor of FIGURES 1–4.
Figure 7:
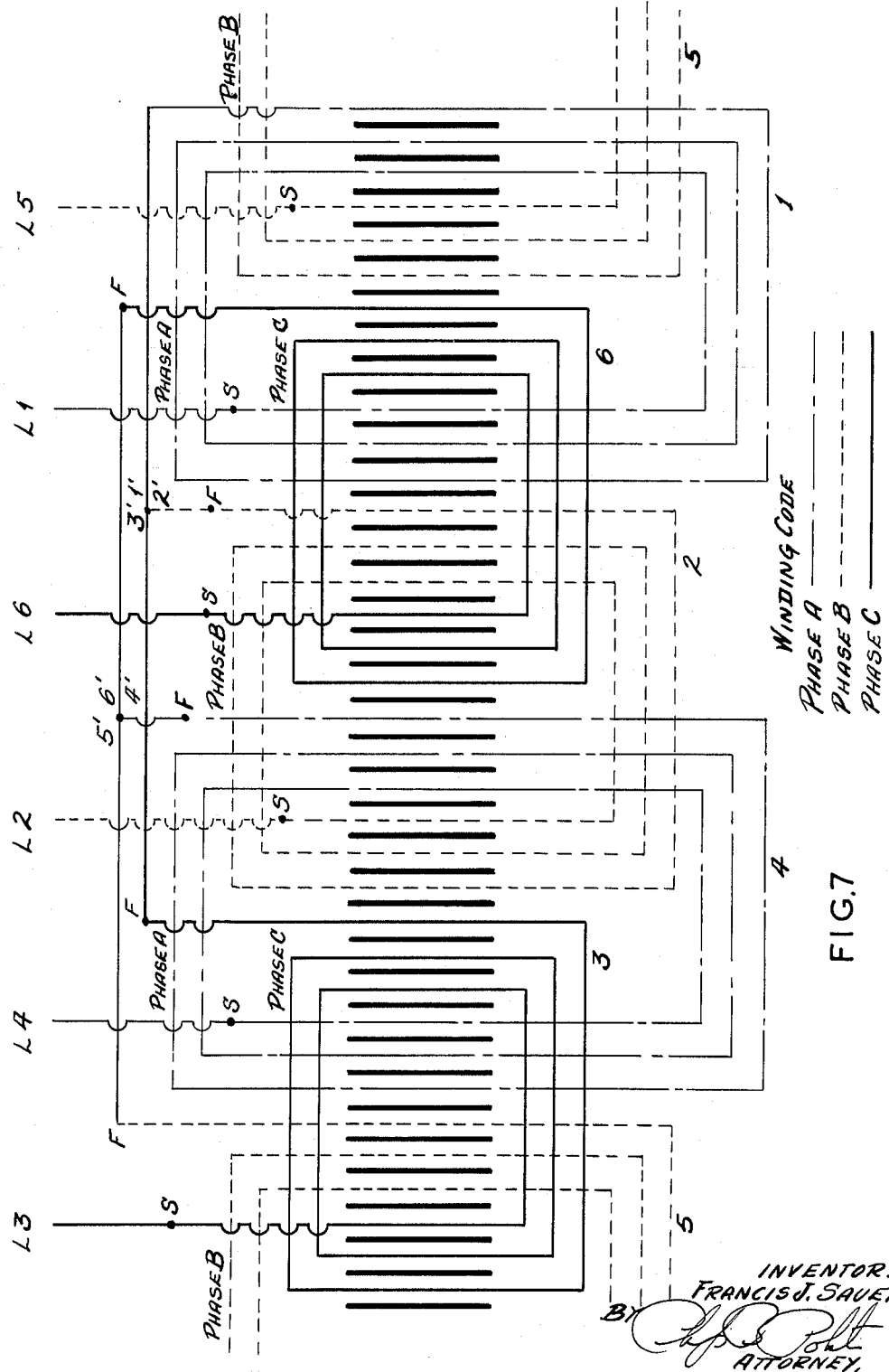
FIGURE 7 is a development diagram of the embodiment of motor illustrated in FIGURES 1–5.

The lead from the start of each coil set to the power line carrying the phase to which the coil set is connected, from a source of power not here shown, is designated L with a subscript indicating the coil set to which it leads. As is indicated in FIGURE 5, leads $L_1$ and $L_4$ are arranged to be connected to phase A, leads $L_2$ and $L_5$ are arranged to be connected to phase B, and leads $L_3$ and $L_6$ are arranged to be connected to phase C.

Figure 3:
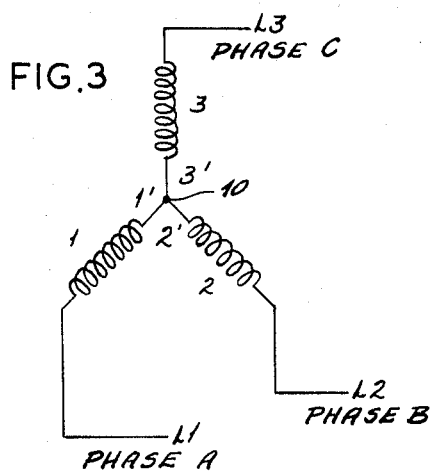
FIGURE 3 is a diagrammatic view showing the electrical connections of one coil set of each coil set pair in the four-pole, three-phase motor of FIGURES 1 and 2.
Figure 4:
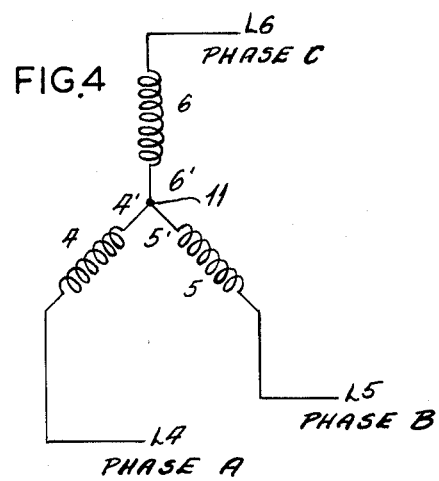
FIGURE 4 is a diagrammatic view showing the electrical connections of the other coil set of each coil set pair in the motor of FIGURES 1, 2 and 3.

As indicated in FIGURES 3 and 4, the finishes of one of the coil sets of each pair are connected together in a Y connection. In the illustrative embodiment shown, the three outboard coil sets are connected at one connection 10, and the three inboard coil sets are connected at another connection 11. The conductors from the finishes of the coils are designated with primes corresponding to the numbers of the coils.

Referring now to FIGURE 2, it can be seen that by extending the reach of the outer coil of each coil set of a pair to encompass 220 electrical (110 mechanical) degrees, instead of the usual 160 electrical (80 mechanical) degrees, in a four-pole, three-phase motor, and by extending the reach of the mediate coil through 180 electrical (90 mechanical) degrees, and extending the reach of the inner coil over 140 electrical (70 mechanical) degrees, a winding is produced which is exactly symmetrical electrically to produce two poles within the compass of the coils (indicated by the radially outwardly pointing arrows S), and two poles between the outer coils of the coil sets, of opposite polarity from the poles within the compass of the coils (indicated by the radially inwardly pointing arrows N).

It is believed that the inner and mediate coils are chiefly responsible for the production of the "encompassed" poles S, and that the outermost and mediate coils are chiefly responsible for the producing of the poles N. It is understood that the south and north poles in an A.C. motor of this character are constantly in the process of reversing, so that the representation, FIGURE 2, is merely a diagrammatic represenation of the situation at one instant of time. Each of the coil set pairs produces, sequentially, the same condition of four poles, as the phases succeed one another, creating the usual rotating field.

In referring to the two coil sets of a pair, the expression "so related electrically as to produce between them poles of the opposite polarity from and comparable flux distribution to the poles produced within the compass of the coils constituting the set" is used in the claims. This electrical relationship is illustrated in FIGURE 2. Considered only from the viewpoint of the direction of the current flow in the wires in the slots, i.e., disregarding the existence of the end wires, it can be seen from FIGURE 2 that the flow of current which produces the north poles is in the opposite direction from, and, assuming a uniform distribution of the wire in the slots, exactly equal in amount and distribution as the flow of current which produces the south poles.

The starting circuit of this embodiment of motor is illustrated in FIGURES 3, 4 and 5. As shown diagrammatically in FIGURE 5, switches 20, 30 and 40 in the lines A, B and C respectively are arranged initially to energize coils 1, 2 and 3, and subsequently, after a predetermined time, to energize coils 4, 5 and 6. While this is a simple arrangement, and effective, it is not only possible but, under some circumstances preferable, to connect two outboard coil sets with one inboard coil set, or two inboard coil sets with one outboard coil set. For example, coils 1, 2 and 6 may be connected to be energized initially and 4, 5 and 3 subsequently. Any other combination may be used, so long as every phase is represented in each group of coil sets.

Referring now to FIGURE 1, positioned between coil sets 1 and 3, and between those coil sets and coil set 5, is a thermal protector 60, connected in the conventional manner, not here shown, to break the power connections to the motor in case the motor overheats. Similarly, between the end wires of the coil sets 4 and 6, and between the end wires of those coil sets and the coil set 2, is a thermal protector 65, similarly connected to break the power circuit in case the windings overheat. It can be seen, that these two thermal protectors are in direct heat sensing relation to all six coil sets. If the coil sets of each pair are connected in series instead of parallel, a single thermal protector, either 60 or 65, will suffice to protect the motor. Also, if a suitable heat collector, such as a long copper strap, is used, a single thermal protector may be employed when the coils are connected in parallel. For example, a protector can be positioned somewhere in the area between slots 716 and 726, with a strap or straps extending from the protector to the positions occupied by the protectors 60 and 65 (i.e., to the ends of slots 711 and 732).

The motor illustrated diagrammatically in FIGURE 6 is an eight-pole, three-phase motor with seventy-two slots, four coil sets per phase, and three coils per set. The outermost coils embrace eleven teeth for fifty-five mechanical degrees instead of the theoretical sixty. For smaller eight-pole motors, a forty-eight slot motor with four coil sets per phase and two coils per set is more practical. The starting arrangement in an eight-pole motor may be similar to that in the four-pole motor, half the coil sets in each phase being energized first, and then the other half, but it is preferable to energize oppositely disposed coil sets at one time. Also the positioning of thermal protectors can follow the same pattern described with respect to the motor of FIGURE 1: a protector positioned in the area among the end wires of three phases at each of the four locations suggested by the letter indicating one phase in the diagram, FIGURE 6, sufficing to give complete protection when the windings are connected in parallel.

In operation, assuming that the coils of the motor are connected as indicated in FIGURES 3 and 4, and that the switch shown diagramatically in FIGURE 5 is in the dotted position, to the right, as viewed in FIGURE 5, the motor is started by moving the switch to the left until it reaches the position shown in solid lines in FIGURE 5, when coils 1, 2 and 3 are energized. Surprisingly, it has been found that the motor of this invention draws only in the neighborhood of 48% of the blocked rotor inrush current when the full winding is energized, as compared with the 58 to 70% full of winding locked rotor inrush current obtained with conventional part winding start arrangements. This reduced current results in a reduced rate of heating under locked rotor conditions, as compared with the conventional part winding start arrangements. Continued movement of the switch to the left closes the circuits to coils 4, 5 and 6, at which time all of the coils are energized, and the motor is in its operating condition.

Since the thermal protectors 60 and 65 are each in direct heat sensing relation to coils of all three phases, overheating in the coils of any phase will cause the thermal protector to act to break the circuit to the motor. If the thermal protector is provided with a heat collecting strap, the strap can be placed in contact with the windings of the three different phases. However, even without a heat collecting strap, the thermal protector is in such close proximity to the windings of all three phases as to be in direct heat sensing relation to them.

Thus it can be see nthat a three-phase motor with an integral multiple of four poles is provided, in which the number of coil sets is only half the conventional number, in which all of the slots are utilized, in which, in the preferred embodiment, no two coil sides occupy the same slot, so that no winding insulator between coil sides is needed, in which the coil sets may all be wound on the same jig, since they can be identical, in which the coils can be placed easily either by machine or manually, in which, in using the part winding start connection, the locked rotor inrush current is less than half of the full winding lock rotor inrush current, in spite of the fact that half of the coils are energized, in which, in the part winding start, the magnetic flux densities within the stator for all three phases have a similar balance, in which a balanced resistance as well as reactance is obtained between phases, while using half the number of coils as slots in the stator (i.e., in which the electrical advantages of the lap winding are combined with the mechanical advantages of conventional concentric windings), and in which the arrangement of the coil sets permits one thermal protector to be in direct heat sensing relation to the coils of all three phases.

Having thus described the invention, what is claimed and desired to be secured by Letters Patent is:

1. A three-phase A.C. motor having an integral multiple of four poles, comprising a rotor and a wound slotted stator having a plurality of pairs of substantially identical coil sets, the coil sets of each pair of coil sets being oppositely disposed and made up of a plurality of nesting coils, the coils of said oppositely disposed sets of a pair being electrically connected to one electrical phase to produce within their respective compasses poles of the same polarity and successive coil sets connected to said one electrical phase being displaced 360 electrical degrees, the circumferentially outer of the coils of the said successive coil sets connected to the said one electrical phase each spanning on the order of 240 electrical degrees and being positioned and related electrically to produce between them poles of the opposite polarity from and comparable flux distribution to the poles produced within the compass of the coils constituting the coil set, and successive pairs of coil sets being electrically connected to successive electrical phases and being angularly displaced from one another by 120 electrical degrees.

2. A four-pole, three-phase motor comprising a rotor and a wound slotted stator having three pairs of substantially identical coil sets each coil set being made up of a plurality of nesting coils, the coil sets of each pair being oppositely disposed, connected to one phase and wound to produce within their compasses poles of the same polarity, the circumferentially outer of said coils of the coil sets of a pair being positioned sufficiently close on either side and electrically related to produce between them a pole of opposite polarity from and of comparable flux distribution to the poles within the compass of said coils, successive coil set pairs being connected to successive phases and being displaced angularly 60 mechanical degrees from one another.

3. A four-pole, three-phase motor comprising a rotor and a wound slotted stator having three pairs of substantially identical coil sets each coil set being made up of a plurality of nesting coils, the coil sets of each pair of coil sets being oppositely disposed, connected to one phase and wound to produce, within their compasses poles of the same polarity, the circumferentially outermost of the coils of the coil sets of a pair encompassing on the order of 120 mechanical degrees and being, therefore, on the order of 60 mechanical degrees spaced from one another at each side, and being electrically related to produce between them poles of opposite polarity from and of comparable flux distribution to the poles within the compass of said coils, successive coil set pairs being connected to successive phases and being displaced angularly 60 mechanical degrees from one another.

4. A four-pole, three-phase motor comprising a rotor and a wound slotted stator having three pairs of substantially identical coil sets each coil set being made up of a plurality of nesting coils, the coil sets of each pair of coil sets being oppositely disposed, connected to one phase and wound to produce, within their compasses poles of the same polarity, the circumferentially outer of the coils of the coil sets of a pair encompassing on the order of 120 mechanical degrees and being, therefore, on the order of 60 mechanical degrees spaced from one another at each side, and being electrically related to produce between them poles of opposite polarity from and of comparable flux distribution to the poles within the compass of said coils, one coil set of each pair having its end wires positioned in the stator slots radially outwardly, the outboard coil sets being centered 120 mechanical degrees apart, and the end wires of the other of said coil sets being positioned radially inwardly of the radially outwardly positioned end wire of the outboard coil sets, said inboard coil sets being centered 120 mechanical degrees apart and 180 mechanical degrees from their opposite coil sets.

5. A three-phase A.C. motor having an integral multiple of four poles, comprising a rotor and a wound slotted stator having pairs of oppositely disposed substantially identical coil sets, each coil set being made up of a plurality of nesting coils, the total number of coils in the stator being equal to one half the number of stator slots and each slot containing the reach of only one coil, each of said oppositely disposed coil sets of a pair being connected to one electrical phase to produce within their respective compasses poles of the same polarity and successive coil sets of said phase being displaced 360 electrical degrees, the circumferentially outer of the coils of said successive coil sets of one phase spanning on the order of 240 electrical degrees and being positioned sufficiently close to one another and so related electrically as to produce between them poles of the opposite polarity from and comparable flux distribution to the poles produced within the compass of the coils constituting the coil set, and successive pairs of coil sets being electrically connected to successive phases and being angularly displaced from one another by 120 electrical degrees.

6. A three-phase A.C. motor having an integral multiple of four poles, comprising a rotor and a wound slotted stator having pairs of oppositely disposed substantially identical coil sets, each coil set being made up of a plurality of nesting coils, the total number of coils in the stator being equal to one-half the number of stator slots and each slot containing a side of only one coil, the number of coils per set being equal to the number of slots divided by the product of the numbers of phases and poles, each of said oppositely disposed coil sets of a pair being electrically connected to one electrical phase to produce within their respective compasses poles of the same polarity and successive coil sets of said phase being displaced 360 electrical degrees, the circumferentially outer of the coils of said successive coil sets of one phase spanning on the order of 240 electrical degrees and being positioned sufficiently close to one another and so related electrically as to produce between them poles of the opposite polarity from and comparable flux distribution to the poles produced within the compass of the coils constituting the set, successive coil set pairs being electrically connected to successive phases and being displaced circumferentially in said stator 120 electrical degrees.

7. The motor of claim 1 wherein switch means are provided for initially energizing one coil set of each of the oppositely disposed coil sets and subsequently energizing the other of said coil sets to provide a part winding start.

8. The motor of claim 1 wherein a thermal protector is positioned among the end wires of coils of three phases so as to be in temperature sensing relation with coils of all three phases.

9. A three-phase, four-pole induction motor comprising a rotor and a wound slotted stator having thirty-six slots, defined by an equal number of teeth, and three pairs of substantially identical, oppositely disposed coil sets, each of said coil sets having three coils the inner of which embraces seven teeth, the mediate of which embraces nine teeth and the outermost of which embraces eleven teeth, each side of each coil occupying a separate slot, each pair of coil sets being electrically connected to one phase to produce within their compass poles of the same polarity.

10. A three-phase, four-pole induction motor comprising a squirrel-cage rotor and a wound slotted stator having thirty-six teeth defining thirty-six slots, and three pairs of substantially identical oppositely disposed coil sets, each of said coil sets having three coils, the inner of which embraces seven teeth, the mediate of which embraces nine teeth and the outermost of which embraces eleven teeth, each side of each coil occupying a separate slot, each pair of coil sets being electrically connected to one phase to produce within their compass poles of the same polarity.

11. A three-phase, four-pole induction motor comprising a rotor and a wound slotted stator having thirty-six teeth defining thirty-six slots, and three pairs of substantially identical oppositely disposed coil sets, each of said coil sets having three coils, the inner of which embraces seven teeth, the mediate of which embraces nine teeth, and the outermost of which embraces eleven teeth, the end wire of one coil set of each pair of coil sets being radially outboard of the end wire of the other coil sets, whereby three outboard coil sets are provided centered 120 mechanical degrees apart and three inboard coil sets are provided centered 120 mechanical degrees apart and displaced 60 mechanical degrees from the outboard coil sets, each pair of coil sets, comprising an inboard and outboard coil set centered 180 mechanical degrees apart, being electrically connected to one phase to produce within their compass poles of the same polarity.

12. A three-phase, four-pole induction motor comprising a rotor and a wound slotted stator having thirty-six teeth defining thirty-six slots, and three pairs of substantially identical oppositely disposed coil sets, each of said coil sets having three coils, the inner of which embraces seven teeth, the mediate of which embraces nine teeth, and the outermost of which embraces eleven teeth, the end wire of one coil set of each pair of coil sets being radially outboard of the end wire of the other coil sets, whereby three outboard coil sets are provided centered 120 mechanical degrees apart and three inboard coil sets are provided centered 120 mechanical degrees apart and displaced 60 mechanical degrees from the outboard coil sets, each pair of coil sets, comprising an inboard and outboard coil set centered 180 mechanical degrees apart, being electrically connected in parallel to one phase to produce within their compass poles of the same polarity, and two thermal protectors, positioned approximately 180 mechanical degrees apart, each being located in an area defined by the end wires of adjacent coils of two different phases along a tooth between them and the central span of a coil of the third phase, in temperature sensing relation to the coils of all three phases.

13. A three-phase induction motor having an integral multiple of four poles, comprising a rotor and a wound slotted stator having a number of pairs of substantially identical oppositely disposed coil sets equal to three-fourths the number of poles, the coil sets of each of the pairs of coil sets being electrically connected in parallel to one phase to produce within their compasses poles of the same polarity, and each of said coil sets having a plurality of nested coils the outermost of which coils spans on the order of 240 electrical degrees, the end wire of half of the coil sets connected to each phase being outboard radially of the end wire of the other half of the coil sets, successive outboard coil sets being electrically connected to successive phases and displaced 240 electrical degrees from one another and 120 electrical degrees from successive inboard coil sets, and a number of thermal protectors equal to one half the number of poles, said thermal protectors being substantially equispaced about the stator bore and each being positioned in an area defined by the end wires of the outer coils of adjacent coil sets of two different phases and the center span of a coil set of the third phase, whereby each of the thermal protectors is in direct heat sensing relation to coils of all three phases.

14. A three-phase induction motor having an integral multiple of four poles, comprising a rotor and a wound slotted stator having a number of pairs of substantially identical oppositely disposed coil sets equal to three-fourths the number of poles, the coil sets of each of the pairs of coil sets being electrically connected in series to one phase to produce within their compasses poles of the same polarity, and each of said coil sets having a plurality of nested coils the outermost of which coil spans on the order of 240 electrical degrees, the end wire of half of the coil sets connected to each phase being outboard radially of the end wire of the other half of the coil sets, successive outboard coil sets being electrically connected to successive phases and displaced 240 electrical degrees from one another and 120 electrical degrees from successive inboard coil sets, all of the coil sets of each phase being connected in series and the coil sets of all three phases being connected to form a single Y connection of the three phases, and a thermal protector positioned in an area defined by the end wires of the outer coils of adjacent coil sets of two different phases and the outer span of a coil set of the third phase whereby said thermal protector is in direct heat sensing relation to coils of all three phases.

15. A three-phase induction motor having an integral multiple of four poles, comprising a rotor and a wound slotted stator having a number of pairs of substantially identical oppositely disposed coil sets equal to three-fourths the number of poles, the coil sets of each of the pairs of coil sets being electrically connected in parallel to one phase to produce within their compasses poles of the same polarity, and each of said coil sets having a plurality of nested coils the outermost of which coils spans on the order of 240 electrical degrees, the end wire of half of the coil sets connected to each phase being outboard radially of the end wire of the other half of the coil sets, successive outboard coil sets being electrically connected to successive phases and displaced 240 electrical degrees from one another and 120 electrical degrees from successive inboard coil sets, and a thermal protector having heat collecting means extending between end wires of inboard and outboard coil sets connected to all three phases and in heat sensing relation to at least two coil sets of at least one phase.

References Cited by the Examiner

UNITED STATES PATENTS

| | | | |
|---|---|---|---|
| 1,949,424 | 3/1934 | Laffoon et al. | 310—198 |
| 2,671,879 | 3/1954 | Schwarz | 310—185 X |
| 2,783,403 | 2/1957 | Schumaier | 310—202 X |
| 2,888,644 | 5/1959 | Petzinger et al. | 324—104 |
| 2,905,840 | 9/1959 | Dunn | 310—202 |
| 2,947,894 | 8/1960 | Strang et al. | 310—202 |
| 2,989,654 | 6/1961 | Neyhouse et al. | 310—203 X |

FOREIGN PATENTS 1,001,397 11/1952 Germany.

OTHER REFERENCES

Winding Alternating Current Machines, page 114, Liwschitz-Garik, published by Van Nostrand, 1950.

ORIS L. RADER, *Primary Examiner.*

MILTON O. HIRSHFIELD, *Examiner.*

D. X. SLINEY, D. F. DUGGAN, G. P. HAAS, P. L. McBRIDE, *Assistant Examiners.*